US006782405B1

(12) United States Patent
Matula et al.

(10) Patent No.: US 6,782,405 B1
(45) Date of Patent: Aug. 24, 2004

(54) METHOD AND APPARATUS FOR PERFORMING DIVISION AND SQUARE ROOT FUNCTIONS USING A MULTIPLIER AND A MULTIPARTITE TABLE

(75) Inventors: David W. Matula, Dallas, TX (US); Cristina S. Iordache, Beaverton, OR (US)

(73) Assignee: Southern Methodist University, Dallas, TX (US)

( * ) Notice: Subject to any disclaimer, the term of this patent is extended or adjusted under 35 U.S.C. 154(b) by 368 days.

(21) Appl. No.: 09/876,786

(22) Filed: Jun. 7, 2001

(51) Int. Cl.[7] ............................. G06F 7/44; G06F 7/52
(52) U.S. Cl. ..................................... 708/504; 708/654
(58) Field of Search ................................. 708/504, 654

(56) References Cited

U.S. PATENT DOCUMENTS 5,862,059 A * 1/1999 Matula et al. .............. 708/654
6,223,192 B1 * 4/2001 Oberman et al. ........... 708/502
6,256,653 B1 * 7/2001 Juffa et al. .................. 708/502

* cited by examiner

Primary Examiner—Tan V. Mai
(74) Attorney, Agent, or Firm—Baker Botts L.L.P.

(57) ABSTRACT

The division and square root systems include a multiplier. The systems also include a multipartite table system, a folding inverter, and a complement inverter, each coupled to the multiplier. The division and square root functions can be performed using three scaling iterations. The system first determines both a first and a second scaling value. The first scaling value is a semi-complement term computed using the folding inverter to invert selected bits of the input. The second scaling value is a table lookup value obtained from the multipartite table system. In the first iteration, the system scales the input by the semi-complement term. In the second iteration, the resulting approximation is scaled by a function of the table lookup value. In the third iteration, the approximation is scaled by a value obtained from a function of the semi-complement term and the table lookup value. After the third iteration, the approximation is available for rounding.

12 Claims, 5 Drawing Sheets

PIPELINE SCHEDULE FOR AN IMPLEMENTATION OF POSTSCALED DIVISION

| CYCLE | OPERATIONS |
|---|---|
| 1 | $y \times \hat{y}$, INITIATE LOOKUP OF c |
| 2 | $x \times \hat{y}$ |
| 3 | - |
| 4 | - |
| 5 | $(y\hat{y}) \times c$ |
| 6 | $(x\hat{y}) \times c$ |
| 7 | - |
| 8 | - |
| 9 | 2's COMP $(y\hat{y}c)$ |
| 10 | $(x\hat{y}c) \times (2-y\hat{y}c)$ |
| 11 | - |
| 12 | - |
| 13 | - |
| 14 | INITIATE ROUNDING |
| 15 | ROUNDED OUTPUT AVAILABLE |

TABLE FED PPG CIRCUIT WITH 9 BIT TABLES AND BOOTH RADIX 4 PPG's

FIG. 9

TABLE FED PPG CIRCUIT WITH 11/12 BIT TABLES AND BOOTH RADIX 8 PPG's

METHOD AND APPARATUS FOR PERFORMING DIVISION AND SQUARE ROOT FUNCTIONS USING A MULTIPLIER AND A MULTIPARTITE TABLE

TECHNICAL FIELD OF THE INVENTION

This invention relates in general to the field of integrated data processing, and more specifically to an improved method and apparatus for performing division and square root functions in a system using a multiplier and a multipartite table.

BACKGROUND OF THE INVENTION

The arithmetic unit is one of the most important components of any integrated data processing system. Arithmetic units perform a wide variety of mathematical functions upon operands that are transmitted from other portions of an integrated system. The basic addition, subtraction, and multiplication functions are quickly and efficiently performed in arithmetic units today. Known techniques for performing division and square root functions, however, have not been completely satisfactory with respect to speed and efficiency.

SUMMARY OF THE INVENTION

The speed of performing basic mathematical functions is significant to the efficiency of a data processing system, since the system may need to perform basic mathematical functions many thousands of times per second for a variety of common applications. Multimedia applications typically require relatively low precision division and square root operations, while scientific applications require much higher precision for these operations. The IEEE floating point standard specifies accuracy of a 24 bit fraction in a 32 bit word for single precision and a 53 bit fraction in a 64 bit word for double precision for all basic arithmetic operations including division and square root. Reducing the number of cycles needed to perform one division or square root operation reduces the overall required number of cycles, increasing efficiency.

Known methods for performing division and square root operations produce a single precision result after several iterations and a double precision result after additional iterations. These methods typically incur an initial delay for generating a table lookup operand in addition to a sequence of delays due to dependent additions and/or multiplications between successive iterations. Additive methods perform an iteration in one or two cycles, but require tens of cycles for single and double precision results. More aggressive multiplicative methods employ only a handful of iterations, but operation dependencies result in three to five cycles of delay per iteration.

A common method of performing division and square root operations employs SRT procedures in dedicated hardware. This method is used in, for example, the Pentium family of microprocessors manufactured by Intel Corporation. The procedure generates digits iteratively in a small radix similar to long division. The method, due to iterative dependencies, is extremely slow, typically taking some fifteen cycles for single precision and some thirty cycles for double precision to complete a division operation.

Pipelined multipliers can be used to reduce the number of required cycles. Pipelined multipliers complete a multiplication to double precision in three to five cycles. More importantly, pipelined multipliers typically allow a new multiply operation to start every cycle in a procedure analogous to an assembly line. Known division methods, however, require four to ten dependent multiplications for the highest precision result, where a second multiply must wait for the first multiply to finish and feed back the result as a new operand for the subsequent multiply operation. An independent multiplication, in contrast, does not need to wait for the result of a previous multiply operation and can begin at the next cycle. The feedback latency of three to five cycles is the delay time cost for dependent multiplies, compared with just one cycle for independent multiplies.

The convergence methods of division and square root are preferred in a pipelined unit, because they require fewer dependent multiplications. Known convergence methods for division and square root start from a table lookup approximation of the reciprocal of the denominator (for division) or of the square root reciprocal of the operand (for square root) and perform multiplications to refine the approximation, doubling the accuracy with each iteration.

A known convergence technique for division uses a single lookup table and employs three iterations to refine the approximation of a quotient x/y. First, a table lookup value $t \cdot 1/y$ is determined, then the numerator x and the denominator y of quotient $q=x/y$ are scaled by the table lookup value, yielding:

$$\frac{x}{y} \cdot \frac{t}{t} = \frac{q_{7.5}}{(1-\varepsilon)}$$

where $*\epsilon* \# 2^{-7.5}$, and $q_n$ is an approximation of $q=x/y$ to an n-bit accuracy. Here, the accuracy is determined by the table lookup value. Note that the multiplication operation is delayed by the latency of the table lookup value. Second, the result of the first approximation is scaled by $(1+\epsilon)$:

$$\frac{q_{7.5}}{(1-\varepsilon)} \cdot \frac{(1+\varepsilon)}{(1+\varepsilon)} = \frac{q_{15}}{(1-\varepsilon^2)}$$

where $(1+\epsilon)$ is the 2's complement of the scaled y value from the previous iteration, that is, $(1+\epsilon)=2-yt$. In the third and final iterations, the approximations are scaled two more times:

$$\frac{q_{15}}{(1-\varepsilon^2)} \cdot \frac{(1+\varepsilon^2)}{(1+\varepsilon^2)} = \frac{q_{30}}{(1-\varepsilon^4)} \cdot \frac{(1+\varepsilon^4)}{(1+\varepsilon^4)}$$
$$= \frac{q_{60}}{(1-\varepsilon^8)}$$

where $(1+\epsilon^2)$ and $(1+\epsilon^4)$ are the 2's complement of the scaled y value from the previous iteration, that is:

$(1+\epsilon^2)=2-[yt(2-yt)]$ and $(1+\epsilon^4)=2-[yt(2-yt)][2-yt(2-yt)]$

Note that the accuracy, "n", doubles with each iteration.

The value $q_{30}$ determined after the third iteration is sufficient for single precision. The final denominator scaling $(1-\epsilon^2)\times(1+\epsilon^2)=(1-\epsilon^4)$ for single precision or $(1-\epsilon^4)\times(1+\epsilon^4)=(1-\epsilon^8)$ for double precision need not be computed, but this does not lessen the number of dependent multiplies. Well known rounding procedures are then applied to $q_{30}$ or $q_{60}$ to determine the final result with several additional cycles delay.

Convergence division implementations typically employ three to four iterations to obtain the desired accuracy, starting with a fairly small table with, for example, a seven to nine bit accuracy. Use of larger tables becomes impractical as the table size grows exponentially with the number of bits. Table computations, such as linear interpolation, allow a larger starting accuracy and a reduced number of iterations at the cost of the multiple cycle delay of the table lookup computations. Known techniques for conversion division still take 15 to 30 cycles due to the succession of pipeline delays for dependent multiplication.

Therefore, a need has arisen for a system that performs division and square root functions and yields approximate quotients and square roots of accuracy sufficient for known single and double precision rounding procedures, but which substantially reduces the number of cycles lost to dependencies between the table lookup and successive multiplications.

In accordance with the present invention, a method and system for performing division and square root functions are provided which substantially eliminate or reduce the disadvantages and problems associated with prior arithmetic techniques used to perform division and square root functions.

The division and square root systems of the present invention comprise a multiplier. The systems also comprise a multipartite table system, a folding inverter, and a complement inverter, each coupled to the multiplier. More specifically, the multipartite lookup table may comprise a tripartite lookup table. The present invention may further comprise data links coupling the parts of the system and a rounder that rounds the final approximation.

According to one embodiment of the present invention, the division and square root functions can be performed using three scaling iterations. The system first determines both the first and the second scaling values. The first scaling value is a folded or semi-complement value of an input denominator (for division) or operand (for square root) y, hereinafter referred to as the "semi-complement term", which is obtained directly from the bit representation of y and thus available in the first cycle after a single logic level. The second scaling value is the value obtained from the table system, hereinafter referred to as the "table lookup value". In the first iteration, the system scales the input operand by the semi-complement term. Second, the resulting approximation is scaled by a function of the table lookup value. Third, the approximation is scaled by a value obtained from a function of the semi-complement term and the table lookup value. After the third iteration, the approximation is available for rounding.

In one embodiment of a square root system, the multipartite table may be cut in half, such that for certain denominator values the result of the second iteration is multiplied by an appropriate binade value.

An important technical advantage of the present invention is that it performs the table lookup function concurrently with the first scaling of the numerator and the denominator. That is, the present invention can perform the first scaling step without waiting for the result of the table lookup. Another important technical advantage of the present invention inheres in the fact that it uses a multipartite lookup table. Fast computation of quotient and square root values to double extended precision requires good starting approximations, such that only one or two convergent iterations need to be performed. Good starting approximations can only be obtained by refining the table lookup values, since the size of a direct lookup table would be prohibitive for current technologies. The multipartite table forms the table lookup faster as the sum of 2, 3, or 4 table lookup values. The index sizes for the tables are chosen such that the required accuracy is guaranteed while the total table size is minimized.

BRIEF DESCRIPTION OF THE DRAWINGS

For a more complete understanding of the present invention and the advantageous thereof, reference is now made to the following description taken in conjunction with the accompanying drawings in which like reference numbers indicate like features and wherein.

to 27 bit accuracy.

DETAILED DESCRIPTION OF THE INVENTION

Arithmetic Unit

Figure 1:
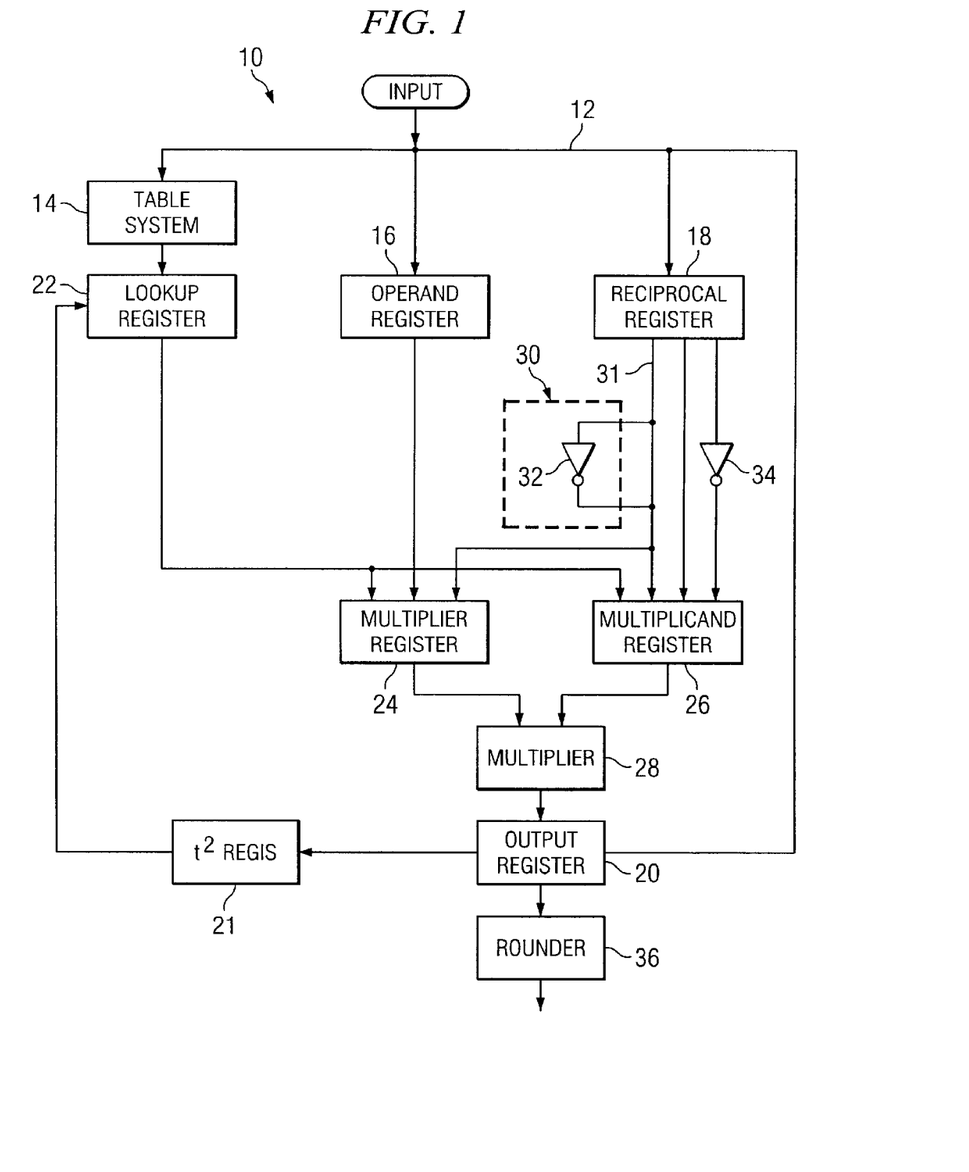
FIG. 1 is a block diagram of an arithmetic system that may be used with the present invention.

FIG. 1 is a block diagram of an arithmetic unit indicated generally at 10 that is capable of performing the methods of division and square root of the present invention. Referring to FIG. 1, the arithmetic unit 10 uses a system bus 12 for communication between other portions of a processing system (not shown) and the arithmetic unit 10. The arithmetic unit may be, for example, part of a Pentium processing chip or a Cray system. System bus 12 may include, for example, data lines, address lines, and control lines associated with the operation of a microprocessor, memory, and other components of a data processing system and the arithmetic unit 10. Coupled to the system bus 12 are a table system 14, an operand register 16, a reciprocal register 18, and an output register 20. The table system 14 supplies the table lookup value used to scale the denominator (for division) or the operand (for square root). Registers generally store binary values, and may comprise, for example, latch circuits or dedicated or transient portions of memory. Generally, though not in every case as will be discussed herein, the operand register 16 stores the value to be scaled, the reciprocal register 18 stores the value to be converted to the scaling value, and the output register 20 stores the output of a multiplier 28. The table system 14 is coupled to a lookup register 22, a square register 21, a multiplier register 24, and a multiplicand register 26. The lookup register 22 stores the output of the table system 14. Generally, the square register 21 stores the square of the output of the table system 14. The multiplier register 24 and the multiplicand register 26 are coupled to the inputs of multiplier 28. The multiplier register 24 stores the multiplier operand and the multiplicand register 26 stores the multiplicand operand to be used in the multiplication operation performed by the multiplier 28. The multiplier 28 may comprise, for example, a modified Booth recoding array multiplier or other suitable system for performing the multiplication function accurately and quickly. According to one embodiment, the multiplier 28 is pipelined so that, if necessary, it can begin a new multiplication operation each clock cycle even though the operation of the multiplier array within multiplier 28 requires more than one cycle to calculate a product.

The operand register 16 is coupled to the multiplier register 24, and the reciprocal register 18 is coupled to the multiplicand register 26. A folding inverter 30 is coupled to the reciprocal register 18, the multiplier register 24, and the multiplicand register 26. The folding inverter comprises an inverter 32 and serves to invert specified bits of the output of the reciprocal register 18; bits that are not inverted pass through path 31. A complement inverter 34 is coupled to the reciprocal register 18 and the multiplicand register 26. The complement inverter 34 inverts specified bits of the output of the reciprocal register 18 in order to provide a scaling value, which is stored in multiplicand register 26. The output register 20 is coupled through a square register 21 to the lookup register 22, the table system 14, and a rounder 36. The rounder 36, functions to round the output of the output register 20. The operation of the arithmetic unit 10 will be discussed more fully with reference to FIGS. 3 and 4 herein.

Multipartite Table System

Figure 2:
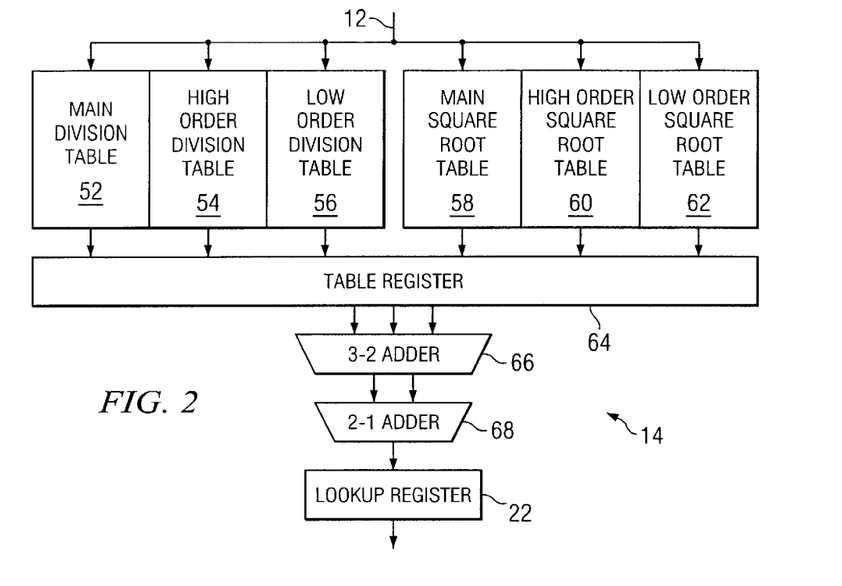
FIG. 2 is a block diagram of a table system that may be used in conjunction with the present invention.

FIG. 2 is a block diagram of one embodiment of the multipartite table system 14. According to this embodiment of the present invention, multiple lookup tables are provided in order to reduce table size. Additionally, the size of a square root lookup table may be cut in half by using a table for just one binade and conditionally multiplying an intermediate result by the appropriate binade value. For example, if a lookup table is divided into one table for y 0 [1, 2) and one for y 0 [2,4), an intermediate result is conditionally multiplied by √2 for y 0 [2,4).

Referring to FIG. 2, the table system 14 is coupled to the system bus 12 of FIG. 1. The table system 14 comprises a main division table 52, a high order division table 54, and a low order division table 56, each coupled to the system bus 12. The table system 14 also comprises a main square root table 58, a high order square root table 60, and a low order square root table 62, each coupled to the system bus 12. The division tables 52, 54, and 56 store values that add up to an approximation of the square of the reciprocal value of the input denominator. The square root tables 58, 60, and 62 store values that add up to an approximation of the square root reciprocal of the input operand.

Division Table System

According to one embodiment of the present invention, as will be discussed herein, the computation of a numerator divided by a denominator begins by looking up a value from the table system 14 using the denominator as an index into the table.

In one embodiment, denominator y is a normalized p-bit denominator $y = b_{-1}b_0b_1b_2 \ldots b_p$, and numerator x is a p-bit numerator formulated such that $$\frac{y}{2} \leq x < y,$$

that is, $$\frac{1}{2} \leq \frac{x}{y} < 1.$$

Truncated denominator $y_m = \text{trunc}_m(y) = 1.b_1b_2 \ldots b_m$ denotes the denominator truncated to the m most significant bits after the binary point, and $f = .b_{m+1}b_{1+2} \ldots b_p$ $0[0,1]$ denotes the fractional part truncated. Denominator y may be expressed by as:

$$y = y_m + f2^{-m}$$

The table lookup value for division is computed from the sum of values obtained from the three division tables 52, 54, and 56. The main division table 52, indexed by the first L bits of the denominator, stores values computed as follows:

$$C_{L-C_L}{}^2 2^{-2L-3}$$

where $$C_L = \frac{1}{y_L(y_L + 2^{-L})}.$$

The two remaining division tables 54 and 56 store values that add up to an approximation of:

$$C_L^2(2(2f-1)^2 - 1)$$

The high order division table 54 stores values computed as follows:

$$F(R_m(A)) \cdot G(R_m(B))$$

where $$R_m(x) = \text{trunc}_m(x) + 2^{-m-1}, \quad F(y_L) = \frac{1}{(y_L(y_L + 2^{-L}))^2},$$

and $$G(f) = 2(2f-1)^2 - 1$$

The high order division table 54 is indexed by m leading bits of A and bits 2, 3, . . . , m of B, conditionally complemented according to the value of bit 1. The low order division table stores values computed as follows:

$$F'(R_k(A)) \cdot G(R_k(B)) \cdot (A - R_m(A)) + F(R_k(A)) \cdot G'(R_k(B)) \cdot (B - R_m(B))$$

where $$F'(y_L) = \frac{-4(y_L + 2^{-L-1})}{(y_L(y_L + 2^{-L}))^3},$$

and $G'(f) = 8(2f-1)$. The low order division table 56 is indexed by the remaining tails of A and B, k leading bits of A, and k−1 bits of B, conditionally complemented.

The size of the three tables combined is given by:

$$(P+3)2^L+(P-2L)2^{2m-1}+(P-2L+4-m)2^{4P+4+n_f+n_y-8L-4m}$$

where P=required accuracy, and $n_f$ and $n_y$ are parameters that control the number of input bits used in the evaluation of the low order product.

For a "10 bits in, 10 bits out" main division table, an "11 bits in, 7 bits out" high order division table, and an "8 bits in, 5 bits out" lower order division table, the theoretical upper bound on relative error is approximately 26.47 bits, for a combined table size of 5.656 KB. Exhaustive testing of all single precision inputs in the range [1, 2) shows that this scheme yields at least 27.058194 bits of accuracy for this set of inputs.

Square Root Table System

According to one embodiment of the present invention, as will be discussed herein, the computation of a square root of an operand begins by looking up a value from the table system 14 using the operand as an index into the table.

In one embodiment, the table lookup value for square root is computed from the sum of values obtained from three square root tables 58, 60, and 62. The main square root table 58, indexed by the first L bits of the operand, stores:

$$\frac{1}{(y_L+2^{-L-1})^{3/2}} + \frac{3 \cdot 2^{-2L-6}}{(y_L+2^{-L-1})^{7/2}}$$

where $y_L=\text{trunc}_m(y)$. The two remaining square root tables 60 and 62 store values that add up to an approximation of:

$$\frac{3}{4} \cdot \frac{(2(2f-1)^2-1) \cdot 2^{-2L-4}}{(y_L+2^{-L-1})^{7/2}}$$

The high order square root table 60 stores:

$$F(R_m(A)) \cdot G(R_m(B))$$

where $$F(y_L) = \frac{3}{4} \cdot \frac{1}{(x_L+2^{-L-1})^{7/2}}$$

and $G(f)=2(2f-1)^2-1$. The high order square root table 60 is indexed by m leading bits of A and bits 2, 3, . . . , m of B, conditionally complemented according to the value of bit 1. The low order square root table 62 stores values computed as follows:

$$F'(R_k(A)) \cdot G(R_k(B)) \cdot (A-R_m(A))+F(R_k(A)) \cdot G'(R_k(B)) \cdot (B-R_m(B))$$

where $$F'(y_L) = \frac{-21}{8} \cdot \frac{1}{(x_L+2^{-L-1})^{9/2}}$$

and $G'(f)=8(2f-1)$. The low order square root table 62 is indexed by the remaining tails of A and B, k leading bits of A, and k−1 bits of B, conditionally complemented.

The size of the three tables combined is given by:

$$(P+3)2^L+(P-2L-1)2^{2m-1}+(P-2L-m+3)2^{4P+2a-4+n_y+n_f-8L-4m}$$

where P=required accuracy, $n_f$ and $n_y$ are parameters that control the number of input bits used in the evaluation of the low order product. For example, if P=34, a=0, $n_y=1$, and $n_f=2$, then L=12 and m=7. For a "12 bits in, 37 bits out" main square root table, an "13 bits in, 9 bits out" high order square root table, and an "11 bits in, 6 bits out" lower order square root table, the combined exhaustive and theoretical accuracy is 34.003 bits over the range [1, 4), for a combined table size of 29 KB.

Each of the tables 52, 54, 56, 58, 60, 62 is coupled to a table register 64 which stores the output from the tables. A table may comprise, for example, any suitable form of data storage such as DRAM, ROM, EPROM or other suitable systems. The table register 64 is coupled to a 3-2 adder 66, which reduces three inputs to two outputs. The 3-2 adder 66 is coupled to a 2-1 adder 68, which reduces two inputs to one input. The 2-1 adder 68 is coupled to a lookup register 22, which is also shown in FIG. 1.

An important technical advantage of the multipartite table is that it quickly provides a sufficiently accurate starting approximation, which allows for a more accurate output in fewer iterations. That is, the multipartite table allows the system to provide better approximations more quickly, while allowing for a much smaller table as compared to conventional systems.

Alternative Multipartite Table Systems

Two embodiments of multipartite table systems are described. The embodiments are described in more detail in APPENDIX A. In one embodiment, the lookup value is the sum of three or more terms, one high order term and several low order terms. The high order term contributes accuracy of over twice the number of bits in the table order. The addition of several low order terms is designed to increase the accuracy of approximating the quadratic divisor reciprocal term $1/(y\hat{y})$ to about three times the index size.

In the embodiment, m=9, and a fundamental quad reciprocal may be expressed as:

$$C_9 = \frac{1}{y_9(y_9+2^{-9})}$$

A high order term $t_h$ may be expressed as:

$$t_h = C_9 - C_9^2 2^{-21}$$

A divisor reciprocal term may be expressed as:

$$\frac{1}{y\hat{y}} = t_h + \{(42.5)[2(2f-1)^2-1]\} * \left\{\left(\frac{32}{42.5}\right) C_9^2 2^{-26}\right\} + \delta 2^{-44}.$$

A table term may be expressed as:

$$t' = \left(\frac{32}{42.5}\right) C_9^2$$

and $$k=RN_i(42.5)[2(2f_{10}-1)^2-1], \quad -42 \leq k \leq 42$$

where $$f'_{10}=.b_{10}b_{11} \ldots b_{19}$$

and $$f=f'_{10}+2^{-11}.$$

The table with index $b_{10}b_{11}b \ldots b_{19}$ outputs three Booth Radix 4 digits −2 # $d_2$, $d_1$, $d_0$ # 2 such that $k=d_2 \times 16+d_1 \times 4+d_0$.

Consequently, the table value is the four term sum $t=t_h+kt'$, which may be expressed as:

$$t=t_h+d_2t'2^{-22}+d_1t'2^{-24}+d_0t'2^{-26}$$

with $t_h$ 9 bits in and (33+10) bits out for $t_h$ and t' and symmetry used to evaluate $d_2, d_1, d_0$ from a 9 bit in table for $f_n'$, the total table size may be approximately 3 Kbytes for accuracy of approximately 27 bits exhaustively confirmed for single precision input.

In another embodiment, a high order term $t_h$ may be expressed as:

$$t_h=C_{11}-C_{11}^22^{-25}$$

A divisor reciprocal term $$\frac{1}{y\hat{y}}$$

then may be expressed as:

$$\frac{1}{y\hat{y}} = t_h + \{(324.5)[2(2f-1)^2 - 1]\} * \left\{\left(\frac{256}{324.5}\right)C_{11}^2 2^{-33}\right\} + \delta 2^{-48}$$

Terms t' and t" may be expressed as:

$$t' = \left(\frac{256}{324.5}\right)C_{11}^2,$$

and also $$t'' = 3t' = 3\left(\frac{256}{324.5}\right)C_{11}^2,$$

and $$k=RN_I((324.5)[2(2f'_{12}-1)^2-1]),$$

$$-324 \leq k \leq 324,$$

$$f'_{12}=.b_{12}b_{13}\ldots b_{23}1.$$

The table with index $b_{12} \ldots b_{23}$ output the Booth Radix 8 digits $-4 \leq d_2, d_1, d_0 \leq 4$ such that $$k=d_2\times 64+d_1\times 16+d_0, -324 \leq k \leq 324.$$

Consequently, the table value may be the four term sum (with digits $d_2, d_1, d_0$ controlling shift/add-subtract select of t' and t"=3t'), expressed as:

$$t=t_h+kt'2^{-33}=t_h+d_2t'2^{-27}+d_1t'2^{-30}+d_0t'2^{-33}.$$

Accuracy of approximately 34 bits may be achieved with tables $t_h$, 11 bits in 38 bits out, and t' and t", 11 bits in 12 bits out, and symmetry allowing $f'_{12}$ to be on 11 bits in 12 bits out. Both recorded digits table, yields table size $2^{11}\times(38+24+12)=18\frac{1}{2}$ kbytes.

Determining t to $x\hat{y}$ approximately 34 bits of accuracy is possible with 11 bit tables, affording a very efficient method for double extended precision.

Alternative Table Lookup Systems

Two embodiments of alternative table systems are described.

(i) Direct Lookup

In one embodiment, a 12 bit index may be used with a single table having, for example, a 38 bit output described by:

$$t = RN_{38}(C_{12}^*) = RN_{38}\left(\frac{1}{y_{12}(y_{12}+2^{-12})} - \frac{2^{-27}}{y_{12}^2(y_{12}+2^{-12})^2}\right)$$

For single precision inputs $1 \leq y \leq 2$, t may approximate the reciprocal of $y\hat{y}$ to 27 bit accuracy. The table size may be, for example, 19 kbytes.

(ii) Bipartite Lookup

In one embodiment, the leading bits of y are partitioned into high, middle, and low order substrings. For example, $y_6=1.b_1b_2b_3b_4b_5b_6$ comprises the high part, four bits $b_7b_8b_9b_{10}$ comprises the middle part, and seven bits $b_{11}b_{12}\ldots b_{17}$ comprises the low part. One lookup table uses the high and middle strings to look up a primary term, which may be described as:

$$t_1=RN_{32}(C_{10}-C_{10}^2 2^{-23})$$

with $$C_{10} = \frac{1}{y_{10}(y_{10}+2^{-10})}.$$

A second lookup table uses the high and low part strings to look up a secondary term, which may be described as:

$$t_2=RN_8(C_6^2[2(2f'-1)^2-1]2^{-23}),$$

with $$C_6 = \frac{1}{y_6(y_6+2^{-6})},$$

and $$f=.b_{11}b_{12}b_{13}b_{14}b_{15}b_{16}b_{17}+2^{-8}.$$

The table output value is the sum $t=t_1+t_2$. For single precision inputs, t may approximate the reciprocal of $y\hat{y}$ to, for example, a 27 bit accuracy. Symmetry allows the second table to be accessed with, for example, a 12 bit index, for a total table size of $8\frac{1}{2}$ kbytes.

Division Method

Figure 3:
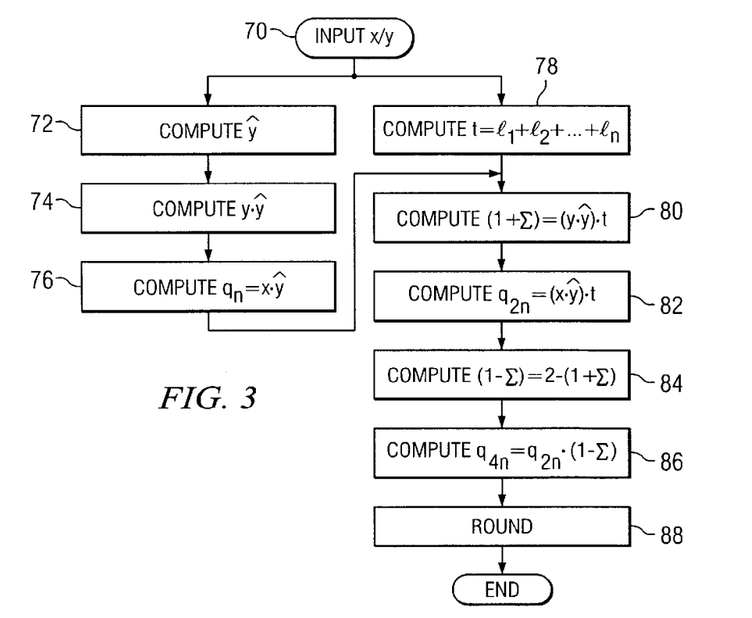
FIG. 3 is a flow chart illustrating one method of division that may be used in the arithmetic system of the present invention.

FIG. 3 is a flow chart illustrating one possible method of division that may be used in the arithmetic system of the present invention. In general, the method shown in FIG. 3 performs the computation of a numerator (dividend) x divided by a denominator (divisor) y by evaluating a first three term product $x\hat{y}t$ to obtain a result of sufficient accuracy for determining a single precision rounded result. Multiplying the first three term product $x\hat{y}t$ by the complement of a second three term product $(y\hat{y}t)'$ yields a result $(x\hat{y}t)\cdot(y\hat{y}t)'$ of sufficient accuracy for determining a double precision rounded result.

The method shown in FIG. 3 performs the division of a numerator x by a denominator y in three scaling iterations. First, the system scales the denominator y and the numerator x by a semi-complement term $\hat{y}=1.b_1b_2 \ldots b_L\overline{b_{L+1}} \ldots \overline{b_p}+2^{-p}$ calculated directly from the input denominator y:

$$\frac{x}{y} \cdot \frac{\hat{y}}{\hat{y}}$$

Second, the system scales the denominator and the numerator by a table lookup value t obtained from the table system:

$$\frac{x\hat{x}}{y\hat{y}} \cdot \frac{t}{t} = \frac{q_{2n}}{(1+\varepsilon)}$$

where 2n is the bit accuracy resulting in the second iteration. Third, the system scales the denominator and numerator by a value obtained from scaling the denominator in the second iteration.

$$\frac{q_{2n}}{(1+\varepsilon)} \cdot \frac{(1-\varepsilon)}{(1-\varepsilon)} = \frac{q_{4n}}{(1-\varepsilon^2)}$$

The output of the third iteration is a suitably accurate version of the desired quotient and is available for rounding. The present invention performs, whenever possible, operation in parallel, in order to decrease the number of cycles needed to complete the operation. For example, the system computes the first and second scaling values concurrently.

Referring to FIG. 3, a detailed examination of the method begins at step 70 where values for the numerator x and denominator y are loaded into the operand register 16 (as shown in FIG. 1) and the reciprocal register, respectively, from system bus 12. The method then proceeds to step 72, where the folding inverter 30 computes a semi-complement term $\hat{y}=1.b_1b_2 \ldots b_L\overline{b_{L+1}} \ldots \overline{b_p}+2^{-P}$. In the folding inverter 30, some bits of y travel through path 31 and remain unchanged, and other bits travel through the inverter 32 and are inverted. The resulting semi-complement term $\hat{y}$ is stored in the multiplier register 24.

The method then proceeds to step 74, where the multiplier 28 computes a scaled numerator y$\hat{y}$. Denominator y moves from the reciprocal register 18 to the multiplicand register 26. The multiplier multiplies denominator y and semi-complement term $\hat{y}$ together, and the output register 20 stores the resulting product y$\hat{y}$. The method then proceeds to step 76, the first scaling iteration. To perform step 76, numerator x moves from the operand register 16 to the multiplier register 24, and semi-complement term $\hat{y}$, which is computed by the folding inverter 30, moves to the multiplicand register 26. The result from step 74, scaled numerator y$\hat{y}$, moves from the output register 20 to the operand register 16. The multiplier 28 multiplies denominator x by semi-complement term $\hat{y}$, yielding a first scaled quotient x$\hat{y}$. The output register 20 stores the first scaled quotient x$\hat{y}$.

While the method is performing steps 72, 74 and 76, the method is also performing step 78, where the table system 14 is computing a table lookup value t. Concurrent calculation of the first and second scaling values decreases the number of cycles required to complete the operation, resulting in a faster overall calculation.

The main division table 52 (as shown in FIG. 2) stores $C_{L-CL}{}^2 2^{-2L-3}$, and is indexed by the first L bits of denominator. The high order and low order division tables 54 and 56 store values that add up to an approximation of $C_L{}^2(2(2f-1)^2-1)$. The high order division table 54 is indexed by m leading bits of A and bits 2, 3, . . . , m of B, conditionally complemented according to the value of bit 1. The low order division table 56 is indexed by the remaining tails of A and B, k leading bits of A, and k−1 bits of B, conditionally complemented. The appropriate values from the division tables 52, 54 and 56 move to table register 64. The three values move to a 3-2 adder 66, which outputs two values. The two values are input into a 2-1 adder 68. The adder 68 outputs a table lookup value t, which is the sum of the values from division tables 52, 54, and 56. The lookup register 22 stores the table lookup value t.

The method then proceeds to step 80, where the multiplier 28 computes a third scaling value complement (1+ϵ) from the scaled numerator y$\hat{y}$, the result of step 74, and table lookup value t, the result of step 78. Scaled numerator y$\hat{y}$ moves from the operand register 16 to the multiplier register 24, and the table lookup value t moves from the lookup register 22 to the multiplicand register 26. The result of step 76, the first scaled quotient x$\hat{y}$, moves from the output register 20 to the operand register 16. Multiplier 28 multiplies scaled denominator y$\hat{y}$ by table lookup value t, yielding (1+ϵ)=(y$\hat{y}$)t. Output register stores the resulting product.

The method then proceeds to step 82, the second scaling iteration, where the multiplier 28 computes the second scaled quotient $q_{2n}$ from the first scaled quotient x$\hat{y}$, the result of step 76, and table lookup value t. The first scaled quotient x$\hat{y}$ moves from the operand register 16 to the multiplier register 24. The multiplicand register 26 stores t. The value y$\hat{y}$t moves from the output register 20 to the reciprocal register 18. The multiplier 28 computes the second scaled quotient $q_{2n}=(x\hat{y})t$, and the output register 20 stores the resulting quotient. The method then proceeds to step 84, where the complement inverter 34 computes the third scaling value (1−ϵ) from (1+ϵ), the result of step 80. Value (1+ϵ) moves from the reciprocal register 18 to the complement inverter 34, which takes the 2's complement of (1+ϵ) to yield (1−ϵ). The multiplicand register 26 then stores the third scaling value (1−ϵ).

The method then proceeds to step 86, the third scaling iteration, where the multiplier 28 computes the third scaled quotient $q_{4n}$ from $q_{2n}$, the result of step 82, and (1−ϵ), the result of step 84. The second scaled quotient $q_{2n}$ moves from output register 20 to the operand register 16 to the multiplier register 24. The multiplier 28 multiplies $q_{2n}$ by (1−ϵ) in the multiplier to yield $q_{4n}$. The output register 20 stores the resulting product. The method then proceeds to step 88, where the rounder 36 rounds the final quotient, completing the operation.

Square Root Method

Figures 4, 5:
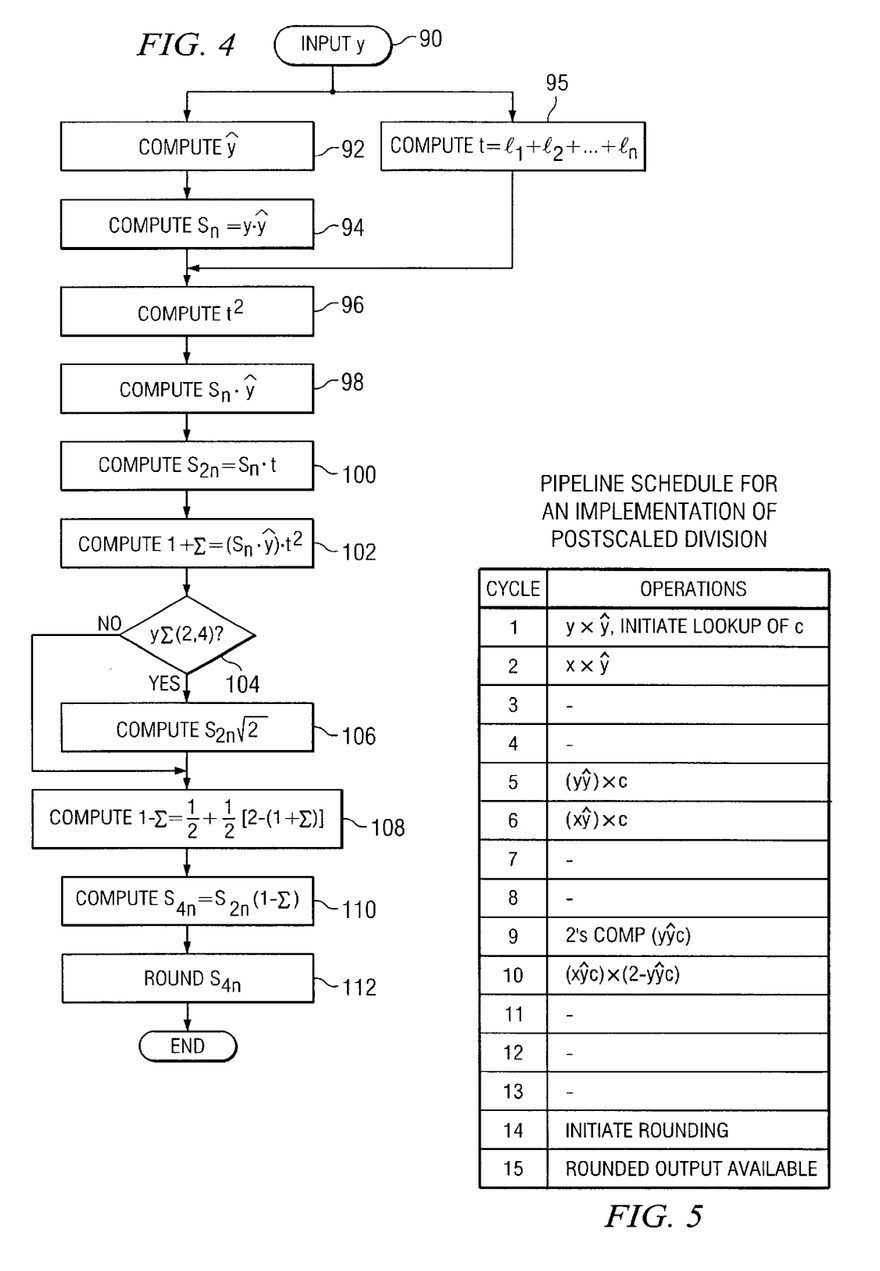
FIG. 4 is a flow chart illustrating one method of square root that may be used in the arithmetic system of the present invention.
FIG. 5 illustrates a pipeline schedule for an implementation of postscaled division.

FIG. 4 is a flow chart illustrating one possible method of square root that may be used in the arithmetic system of the present invention. In general, the method found in FIG. 4 is used to calculate the square root s of an operand y. The calculation can be completed in three iterations. First, the multiplier multiplies the operand y by semi-complement term $\hat{y}$. Second, the multiplier multiplies the resulting approximation by the output t of the table system. Third, the multiplier multiplies the approximation by a function of y, $\hat{y}$, and t. That is, $$s = \sqrt{y} = \frac{y}{\sqrt{y}} \cdot \frac{\hat{y}}{\hat{y}} = \frac{s_n}{\sqrt{y\hat{y}}} \cdot \frac{t}{t}$$

$$= \frac{s_{2n}}{(1+\epsilon)} \cdot \frac{(1-\epsilon)}{(1-\epsilon)}$$

$$= \frac{s_{4n}}{(1-\epsilon^2)}$$

where $s_n = y\hat{y}$ is an n bit approximation of s, $s_{2n} = s_n t$, and $s_{4n} = s_{2n}(1-\epsilon)$. The output of the third iteration is a suitably accurate version of the desired quotient and is then available for rounding. The present invention performs, whenever possible, operations in parallel in order to decrease the number of cycles needed to complete the operation. For example, the system computes the first and second scaling values concurrently.

Referring to FIG. 4, the method begins at step 90, where the operand y is loaded into the operand register 16 and the reciprocal register 18 from system bus 12. The method then proceeds to step 92, where the folding inverter computes the semi-complement term $\hat{y}=1.b_1 \ldots b_L\overline{b_{L+1}}b_{L+1}\overline{b_{L+2}} \ldots \overline{b_{p-1}}+2^{-p}$. In the folding inverter 30, some bits of y travel through path 31 and remain unchanged, and other bits travel through the inverter 32 and are inverted. The multiplicand register 26 stores the resulting semi-complement term $\hat{y}$ and the multiplier register 24 stores y. The method then proceeds to step 94, the first iteration. To perform step 94, multiplier 28 multiplies operand y by semi-complement term $\hat{y}$, yielding first scaled square root $s_n = y\hat{y}$, which is stored in output register 20.

While the system performed steps 92 and 94, it is also performing step 95, where the table system 14 is computing the table lookup value. The main square root table 58 stores $$\frac{1}{(y_L + 2^{-L-1})^{3/2}} + \frac{3 \cdot 2^{-2L-6}}{(y_L + 2^{-L-1})^{7/2}},$$

and is indexed by the first L bits of operand y. The high order and low order square root tables 60 and 62 store values that add up to an approximation of $$\frac{3}{4} \cdot \frac{(2(2f-1)^2 - 1) \cdot 2^{-2L-4}}{(y_L + 2^{-L-1})^{7/2}}.$$

The high order square root table 60 is indexed by m leading bits of A and bits 2, 3, ..., m of B, conditionally complemented according to the value of bit 1. The low order square root table 62 is indexed by the remaining tails of A and B, k leading bits of A, and k−1 bits of B, conditionally complemented. The appropriate values from the square root tables 58, 60 and 62 move to table register 64. The three values move to a 3-2 adder 66, which outputs two values; these two values are input into a 2-1 adder 68. The adder outputs a table lookup value t, which is the sum of the values from square root tables 58, 60, and 62. The lookup register 22, the multiplier register 24, and the multiplicand register 26 store the table lookup value t. First scaled square root $s_n$ moves from the output register 20 to the operand register 16.

The method then proceeds to step 96, where the multiplier 28 multiplies table lookup values t by t. The output register 20 and the square register 21 store the resulting product. The method then proceeds to step 98, where first scaled square root $s_n$ is multiplied by semi-complement term $\hat{y}$. First scaled square root $s_n$ moves from the operand register 16 to the multiplier register 24. The multiplier 28 multiplies first scaled square root $s_n$ by semi-complement term $\hat{y}$. The output register 20 stores the resulting product $s_n\hat{y}$.

The method then proceeds to step 100, the second scaling iteration, where the multiplier 28 computes a second scaled square root $s_{2n}$ from $s_n$, the result of step 94, and the table lookup value t. First scaled square root $s_n$ moves from the operand register 16 to multiplier register 24. Table lookup value t moves from the lookup register 22 to the multiplicand register 26. Value $S_n\hat{y}$ moves from the output register 20 to the operand register 16. The multiplier 28 computes second scaled square root $s_{2n} = s_n t$, and output register 20 stores the resulting product.

The method then proceeds to step 102, where the multiplier 28 computes the third scaling value complement $(1+\epsilon)$ from $S_n\hat{y}$, the result of step 98, and $t^2$, the result of step 96. Value $S_n\hat{y}$ moves from the operand register 16 to the multiplier register 24 and $t^2$ moves from the square register 21 to the lookup register 22, the multiplier register 26. The multiplier 28 computes value $(1+\epsilon) = S_n\{t^2$, and the output register 20 and the reciprocal register 18 store the result. The method then proceeds to step 104. The size of the lookup table may be cut in half by using the table for just one binade and conditionally multiplying an intermediate result by the appropriate binade value. For example, here the lookup table is divided into one table for y 0 [1, 2) and one for y 0 [2,4). Only the table for y 0 [1, 2) is used, and an intermediate result is conditionally multiplied by $\sqrt{2}$, as shown in step 106. If y 0 [2,4), then the method proceeds to step 106 where $s_{2n}$ is multiplied by $\sqrt{2}$. Then the method proceeds to step 108. If y ∫ [2,4), then the method proceeds directly to step 108. In step 108, the system computes the third scaling value $(1-\epsilon)$. The complement converter 34 computes $(1-\epsilon) = 2 + 2[2-1+\epsilon)]$ from the result of step 102. The multiplicand register 26 stores the resulting value. The method then proceeds to step 110, the third scaling iteration, where the multiplier 28 computes the third scaled square root $s_{4n}$ from $s_{2n}$, the result of step 100, and the third scaling value $(1-\epsilon)$, the result of step 108. Second scaled square root $s_{2n}$ moves from the operand register 16 to the multiplier register 54. The multiplier 28 multiplies $s_{2n}$ by $(1-\epsilon)$ yielding $s_{4n} = s_{2n}(1-\epsilon)$. Output register 20 stores the resulting product $s_{4n} = s_{2n}(1-\epsilon)$. The rounder 36 rounds the final square root approximation of the system, as stated in step 112, completing the operation.

In summary, the present invention provides a method for performing division and square root functions, which comprises three iterations: scaling the input by a semi-complement term, scaling the approximation by a function of the table lookup value, and scaling the approximation by a function of the semi-complement term and the table lookup value. The method computes the first and second scaling terms concurrently, thus decreasing the number of cycles required for the operation. Moreover, the particular circuit embodiment described herein uses a multipartite lookup table, which provides desired accuracy with a minimum amount of space.

Although the invention has been described in connection with a particular embodiment, it should be understood that the method of performing the square root or division functions of the present invention is equally applicable to a large number of types of multipliers, multipartite tables, and processing systems. The disclosure of a particular arithmetic unit described herein is for the purpose of teaching the present invention and should not be construed to limit the scope of the present invention, which is solely defined by the scope and spirit of the appended claims.

APPENDIX A is included to provide details of the mathematical formulations used for one embodiment of the present invention.

APPENDIX A

Postscaled Division

Let $y=1.b_1b_2b_3 \ldots b_{p-1}$ be a normalized p-bit divisor and $y < x \leq 2y$ be a p-bit dividend normalized relative to y so that the infinitely precise quotient falls in the standard binade $$1 \leq q = \frac{x}{y} < 2.$$

Let $y_i = 1.b_1b_2b_3 \ldots b_i$, with the i bit string $b_1b_2b_3 \ldots b_i$ providing the primary index for a reciprocal function table lookup. Let $f = .b_{i+1}b_{i+2} \ldots b_{p-1}$ be the low order part of y normalized as a fraction so that $y = y_i + f2^{-i}$. We shall also be interested in a partially complemented version of the divisor $\hat{y} = y_i + (1-f)2^{-i}$, termed the low order part complemented divisor.

Properties of Postscaled Division

The latency for a single precision rounded result is two multiply latencies plus the rounding latency.

The latency for a double precision rounded result is three multiply latencies plus the rounding latency.

For a pipelined multiplier with the remainder sign computed in alternative circuitry, the pipeline stall determining the throughput is just one multiply latency for single precision division, and two multiply latencies plus one cycle for double precision division.

The facility to schedule multiplication by the table lookup value c as the second operation in evaluating the three term product $x\hat{y}c$ (alias postscaling), allows the time of a full multiply latency for table assisted computation of c.

FIG. 5 illustrates a pipeline schedule for a double precision implementation of postscaled division. In this example we have assumed a 4 cycle latency multiply operation for a dependent multiply which allows up to four cycles for lookup of c. We have also assumed that rounding can be performed in two cycles by producing two alternative rounded values with final selection dictated by the parallel computation of the remainder sign (+, −, or zero) in special circuitry.

The postscaled division example of FIG. 5 suggests the feasibility of implementing IEEE standard double precision division with a throughput of 9 cycles and a latency of 15 cycles. A necessary feature to achieve such an implementation is a cost effective table lookup procedure for determining $$c \approx \frac{1}{y\hat{y}}$$

to some 27 bits of accuracy. The case for double extended precision (p=64) division is considerably more demanding. To achieve a 64 bit rounded quotient, and possibly also to support an internal division of say 68 to 70 bits for microcoded transcendentals, some 33 to 35 bits of accuracy in the approximate c would be required.

Observation. The reciprocal function $$\frac{1}{y\hat{y}}$$

for a given i and f satisfies $$\frac{1}{y\hat{y}} = C_i + \frac{1-8f(1-f)}{y_i^2(y_i+2^{-i})^2}2^{-(2i+3)} + \delta 2^{-(4i+4)}, \quad (5)$$

with $0 \leq \delta < 1$, where $$C_i = \frac{1}{y_i(y_i+2^{-i})} - \frac{2^{-(2i+3)}}{y_i^2(y_i+2^{-i})^2}. \quad (6)$$

Note that $C_i$ is a function of the i bit primary index $b_1b_2b_3 \ldots b_i$ and may be looked up to any desired accuracy in a table of sufficient width, say here between 3i and 4i+4 bits. For $1 \leq a \leq 2i$, let $$C' = C'(y_i, f) - \frac{1-8f(1-f)}{y_i^2(y_i+2^{-i})^2}(1+\varepsilon 2^{-\alpha}), |\varepsilon| < 1, \quad (7)$$

be an approximation of the second term in (5) accurate to $\alpha$ bits.

Employing $c = C_i + C'2^{-(2i+3)}$ then yields a quotient approximation $x\hat{y}c$ of accuracy some $2i+\alpha+3$ bits.

Indirect Bipartite Table Lookup

Direct bipartite evaluation of $c = C_i + C'$ involves table lookup of $$C' = \frac{1-8f(1-f)}{y_i^2(y_i+2^{-i})^2}$$

using some $$\frac{i}{2}$$

leading fraction bits from $y_i$ and f. Only some $$\alpha \approx \frac{i}{2} - 2$$

bits of improvement come from the C' term due to the excessive non linearity in both the numerator f-factor $1-8f(1-f)$ and reciprocal denominator y-factor $$\frac{1}{y_i^2(y_i-2^{-i})^2}.$$

Note in particular that for $$1 \leq y \leq 1\frac{1}{8},$$

the y-factor covers the interval $[0.625, 1]$, which is most of a binade. Similarly, for $0.933 \leq f \leq 1$, the f-factor covers the binade $[0.5, 1]$. Thus some four bits (two for y and two for f) of the C' table index is lost to this non linear "overhead".

Using an 11-bits-in 29-bits-out table for $C_{11}$ and an 8-bits-in 8-bits-out table for C', the approximation $c=C_{11}+C'$ was confirmed to provide 27 bit accuracy for approximation of $$\frac{1}{y\hat{y}}.$$

The tables total a somewhat modest size of 7.5 Kbytes, but further reduction is desirable. Note that a 10-bits-in table for $c=C_{10}+C'$ requires a table index of some 12 bits for C' to produce a 27 bit accurate c, making the secondary table too large.

We now present an indirect bipartite lookup algorithm that substantially reduces table size at the cost of an additional dependent table lookup step in the lookup value latency. We introduce an index mapping table that briefly at operates as follows. The range $$\left[\frac{1}{16}, 1\right]$$

of the factor $$\frac{1}{y_i^2(y_i+2^{-i})^2}$$

is partitioned into $2^{n'}$ intervals with widths of equal or decreasing size as the interval boundaries approach unity. The $y_i$ mapping table is i-bits-in, n'-bits-out giving an n' bit y-key denoting the interval containing the factor $$\frac{1}{y_i^2(y_i+2^{-i})^2}.$$

For the factor 1−8f (1−f) the unit interval is partitioned into $2^{n''}$ intervals with widths of non increasing size. The $f_j$ mapping table is then a j-bits-in, (n''+1)-bits-out table giving a sign bit and an n'' bit f-key denoting the interval containing the magnitude of the factor $1-8f_i(1-f_j)$, where $f_i=b_{i+1} b_{i+2} \ldots b_{i+j}1$ is determined by the j-bit secondary index $b_{i+1} b_{i+2} \ldots b_{i+j}$. The $y_i$ and $f_j$ mapping table output keys are concatenated to form an (n'+n'') bit index to a product table that produces an approximation of C'.

Indirect Bipartite Lookup Algorithm

This algorithm uses three table lookups and an addition to form the lookup value $$c = C_i + C' \approx \frac{1}{y\hat{y}}.$$

Step 1: The primary index $b_1 b_2 \ldots b_i$ is utilized to lookup both the term $C_i$ and an $$n' \approx \frac{i}{2}$$

bit y-key for the factor $$\frac{1}{y_i^2(y_i+2^{-i})^2}.$$

Separably and in parallel a j≈i bit index $b_{i+1} b_{i+2} \ldots b_{i+j}$ is utilized to lookup an $$n'' \approx \frac{i}{2}$$

bit f-key and a sign bit s in an $f_j$ mapping table.

Step 2 [Second level lookup]: The y- and f-keys are concatenated to form an (n'+n'')≈i bit index into a product table providing the magnitude of C'.

Step 3 [Fusion]: The value $c=C_i+(-1)^1|C'|$ is formed.

Performance of Indirect Bipartite Lookup

Latency: The latency is the time of two successive i bit table lookups plus a small precision integer addition.

Accuracy: The accuracy is $\approx \left(\frac{5}{2}2+3\right)$ bits.

Table Size: The total table size is about $2^{(i-10)}\left(\frac{i+1}{2}\right)$ Kbytes, split about ⅔ for $C_i$ and ⅓ for the C' tables.

The symmetry of the product f(1−f) allows the $f_j$ mapping table to be halved in size by employing the conditionally complemented j−1 bit index determined by $$f_j^i = \begin{cases} .0b_{i+2}b_{i+3}\cdots b_{i+j}1 & \text{if } b_{i+j}1 = 0, \\ .\overline{0b_{i+2}b_{i+3}\cdots b_{i+j}1} & \text{if } b_{i+j}1 = 1. \end{cases} \quad (8)$$

Figure 6:
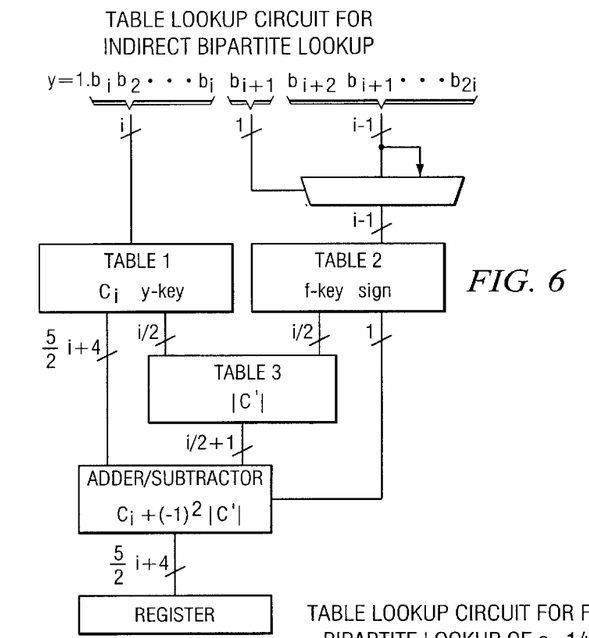
FIG. 6 illustrates a table lookup circuit for indirect bipartite lookup.

FIG. 6 illustrates a circuit for indirect bipartite lookup. Let us consider the case i=10 in FIG. 6. Table 1 employs a 10-bits-in 34-bits-out table producing both a 29 bit value for $C_{10}$ and a 5-bit key. Table 2 uses the conditionally complemented 9 bit index for $f_{10}{}^i$ from (8) to output a sign bit and a 5 bit key. Table 3 employs a 10 bit index formed form the two keys to output a 6 bit value for the magnitude of C'. The adder then yields a 29 bit value for $$\frac{1}{y\hat{y}} \approx c = C_{10} + (-1)^i |C'|.$$

Total table size is slightly less than 5½ Kbytes with accuracy for $$\frac{1}{y\hat{y}}$$

of about 28 bits.

The indirect bipartite lookup algorithm can be refined to allow for smaller table sizes by having the mapping tables produce keys denoting floating point factors. Specifically, the $y_i$ mapping table can provide a 2 bit exponent and an $n^1 \approx \frac{1}{2}i$ bit index denoting one of $2^{n'}$ intervals covering the range $$\left[\frac{1}{2}, 1\right]$$

that contains the significand value for the y-factor $$\frac{1}{y_i^2(y_i + 2^{-i})^2}.$$

Similarly, the $f_j$ mapping table can provide a sign bit, an exponent, and an n" bit index for the significand value of the factor $1-8f_j(1-f_j)$. This allows the product table to output a floating point product having one additional bit of accuracy since each of the input significands is in an interval of about one half the size of the inputs previously described.

Figure 7:
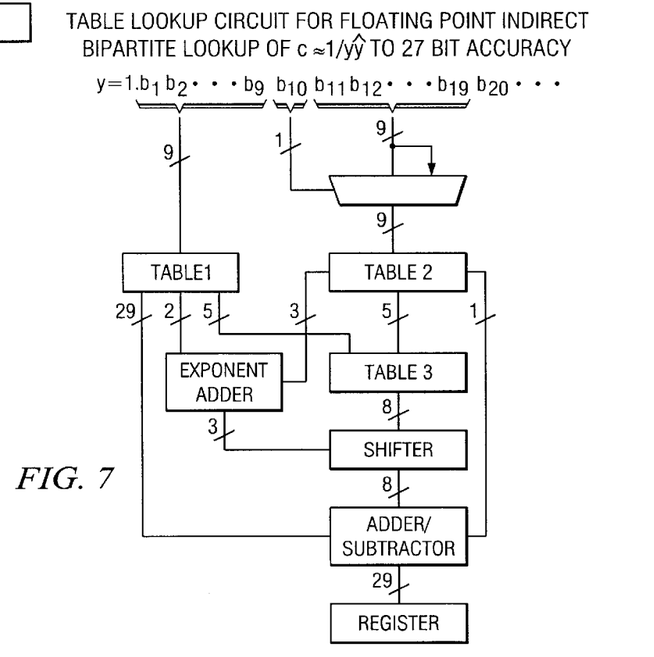
FIG. 7 illustrates a table lookup circuit for floating point indirect bipartite lookup of $$c \approx \frac{1}{y\hat{y}}$$

FIG. 7 illustrates a circuit for this floating point version using a 9 bit primary index to produce 21 bits of accuracy in $C_9$. The secondary table for C' provides an additional 6 bits of accuracy to achieve $$\frac{1}{y\hat{y}} \approx c = C_9 + C'.$$

In FIG. 7, Table 1 produces a y-key with 2 exponent bits and 5 significand bits determining an interval of width about $1/2^6$ for the factor $$\frac{1}{y_i^2(y_i + 2^{-i})^2}.$$

Table 2 produces an f-key with a sign bit, 3 exponent bits, and 5 significand bits determining an interval of width about $1/2^6$ for the factor $1-8f(1-f)$. Three exponent bits are sufficient since otherwise $|C'|<2^{-29}$. The product is then determined by Table 3 to be in an interval of size less than $1/2^5$, with a mid-point approximation giving accuracy to $\pm 1/2^6$. It is possible to systematically reduce the intervals covering [0.5, 1] from somewhat over $1/2^6$ at 0.5 to somewhat less than $1/2^6$ at unity, allowing the product table to produce about ½ bit extra accuracy in the limit. The details are somewhat tedious and will not be given here. The extra accuracy allows for relatively few output guard bits to provide the overall 27 bit accuracy.

The architecture of the table lookup scheme in FIG. 7 provides for 9 bit indices for Tables 1 and 2, which should be implementable in a single cycle. The 10 bit index lookup of Table 3 and shift of the output should be possible in at most 2 more cycles, with a $4^{th}$ cycle for the low precision addition. This lookup scheme would match the critical path for a four cycle latency multiplier producing the first product $x\hat{y}$ in the postscaled algorithm. Note that the total table size here is under 4 Kbytes to achieve the 27 bit accurate result at a latency of two successive table lookups followed by a shift and a 2-1 add. Furthermore, note that the adder-subtractor could be replaced by a redundant binary recoder [Ni82, DM95, LM95] providing the output c in Booth recoded form for use in the subsequent multiply operation.

The floating point indirect bipartite lookup procedure provides a candidate for double extended precision accuracy using i=12. In this case the six hit significand keys for the y- and f-factors yield a 12 bit index product table with output producing C' to some 7 bits of accuracy. The term c is then available to some 34 bits of accuracy sufficient for a double precision quotient of some 69 bits of accuracy.

In this case the total table size would be some 28 Kbytes, with the successive 12 bit table lookups possibly extending the table lookup computation beyond the pipelined multiplier feedback latency. For double extended precision postscaled division an alternative multipartite table procedure is described in the next section.

All three bipartite algorithms for approximating $$\frac{1}{y\hat{y}}$$

by $c=C_i+C'$ employ a primary table for $C_i$ that contributes accuracy quadratically to c at the rate of 2 bits of accuracy per table index bit. Similarly, the three algorithms contribute just ½ bit of accuracy per table index bit in the secondary table system for C'. The substantial improvement in accuracy as a function of table size for the indirect bipartite schemes derives from the design overhead changing from a penalty of two bits to a bonus of one bit in contributions from the secondary table system. Table 1 summarizes the contributions of the table system components in terms of bits of accuracy added per table index bit. Employing bipartite lookup with i bit primary and secondary table indices yields accuracy at the asymptotic rate of 2½ bits per table index bit in all three cases in Table 1. Alternative table assisted schemes are needed to obtain a higher asymptotic rate.

TABLE 1

Bits of accuracy $$\frac{1}{y\hat{y}}$$

approximation per table index bit of the primary and secondary tables for various bipartite lookup algorithms.

| Table Part | Direct Bipartite | Indirect Bipartite | Floating Point Indirect Bipartite |
| --- | --- | --- | --- |
| Primary | 2i + 3 | 2i + 3 | 2i + 3 |
| Secondary | ½i · 2 | ½i | ½i + 1 |

Table 1. Bits of accuracy in $$\frac{1}{y\hat{y}}$$

approximation per table index bit of the primary and secondary tables for various bipartite lookup algorithms.

A Multipartite Lookup Algorithm

An asymptotic rate of three bits of accuracy per table index bit is seen to be theoretically possible by employing an underlying log/antilog table system. Consider that a first pair of tables can deliver the logs of the y-factor and f-factor of C". The logs can be added and input to an antilog table determining C', which is then added to $C_i$ to determine c. With i bit indexed base 2 log and antilog tables for the mantissas, essentially i bits of accuracy can be obtained for C' providing a 3i bit accurate c. The latency is two successive i bit table lookups alternating with two 2-1 low precision additions. For table size indices i=11 or 12 as may be needed for double extended precision, the latency of this log/antilog system could exceed the pipelined multiplier feedback latency.

In the following we present an alternative lookup system achieving a 3i bit accurate $$c \approx \frac{1}{y\hat{y}}$$

over the practical index size range $8 \leq i \leq 12$ with latency a more acceptable i bit table lookup and a 4-1 add. This final table lookup algorithm generates an approximation to the product C' of the y-factor $$\frac{1}{y_i^2(y_i + 2^{-i})^2}$$

and the f-factor $1-8f_j(1-f_j)$ as the sum of three partial products. The algorithm and its performance are outlined followed by more details on two proposed implementations.

Table Fed Partial Product Generation Algorithm

This algorithm uses two table lookups and a 4-1 addition to from the lookup value $$c = C_i + C' \approx \frac{1}{y\hat{y}}.$$

Step 1: The primary index $b_1 b_2 \ldots b_i$ is utilized to lookup the term $C_i$ and one or two n≈i bit scaled partial products of the y-factor $$\frac{1}{y_i^2(y_i + 2^{-i})^2}.$$

Separably and in parallel a j≈i bit secondary index $b_{i+1} b_{i+2} \ldots b_{i+j}$ is utilized to lookup a 3-digit Booth encoded radix 4 or 8 value $d_2\beta^2 + d_1\beta + d_0$ denoting the interval containing the f-factor $1-8f_j(1-f_j)$.

Step 2: Each of the three Booth encoded digits is used to select an appropriate final partial product of the y-factor.

Step 3: The three partial products and the $C_i$ term are accumulated in a 4-1 adder providing c.

Performance of the Table Fed PPG Algorithm

The following performance characteristics pertains to the primary index size range $8 \leq i \leq 12$ with the secondary index size j≈i.

Latency: The latency is an i-bit table lookup followed by a 4-1 addition.

Accuracy: The accuracy is≈3i bits.

Table Size: The total table size is about $2^{(i-10)}$ $$\left(\frac{3}{4}i + \frac{1}{2}\right) \text{ Kbytes.}$$

The table size refers to radix 8 partial product accumulation. For $i \leq 9$, radix 4 PP-accumulation saves about 15% in table size. The Table Fed PPG implementation can be extended to $i \geq 13$ with the same accuracy and table size performance, but the latency must grow to be an i bit table lookup followed by an $$\left[\frac{i}{3}\right]$$

to 1 addition.

Figure 8:
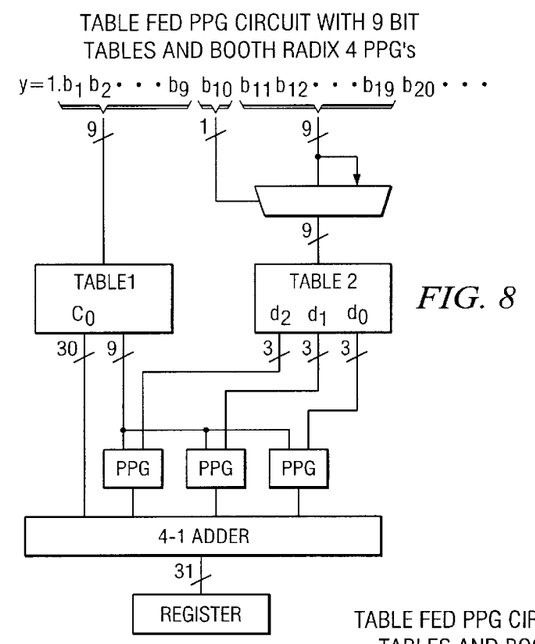
FIG. 8 illustrates a table fed PPG circuit with 9 bit tables and Booth radix 4 PPG's.

FIG. 8 illustrates a Table Fed PPG circuit with 9 bit tables employing radix 4 Booth encoding.

Figure 9:
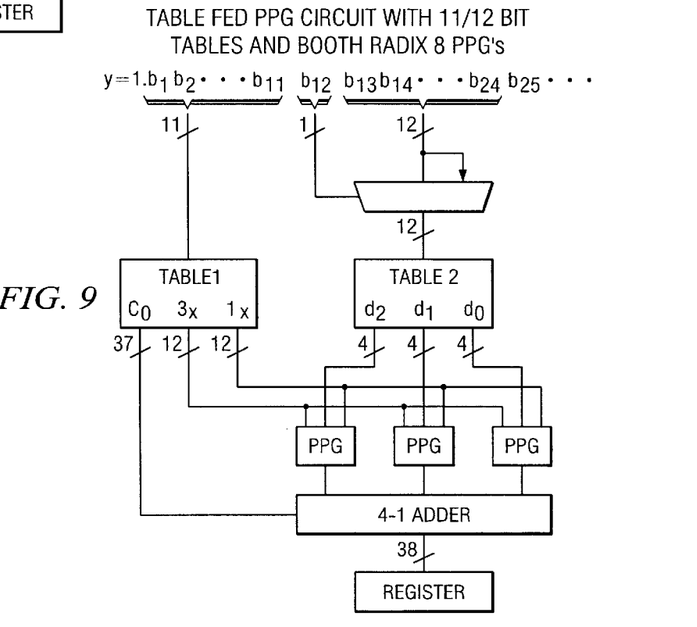
FIG. 9 illustrates a table fed PPG circuit with 11/12 bit tables and Booth radix 8 PPG's.

FIG. 9 illustrates a similar circuit with an 11 bit indexed primary table and a 12 bit indexed secondary table employing radix 8 Booth encoding. The latency and table sizes are evident from the figures. Some details on the table value construction will provide the basis for the accuracy of the resulting approximation in each case.

Note that any fixed multiple of the y-factor $$\frac{1}{y_i^2(y_i + 2^{-i})^2}$$

can be looked up to arbitrary accuracy using the i-bit primary index, so the error analysis rests heavily on the features of the f-factor approximation in Table 2.

Consider the radix 4 case with 9 bit tables in FIG. 8. For radix 4 with digit set $\{-2, -1, 0, 1, 2\}$, the three digit number $N = d_2 4^2 + d_1 4 + d_0$ can represent any integer in the range [−42, 42]. Thus the interval (−1, 1) can be partitioned into 85 intervals $$\left(\frac{N - \frac{1}{2}}{42\frac{1}{2}}, \frac{N + \frac{1}{2}}{42\frac{1}{2}}\right)$$

with N chosen in Table 2 such that the f-factor with j=10 satisfies $$\frac{N - \frac{1}{2}}{42\frac{1}{2}} < 1 - 8f_{10}(1 - f_{10}) \leq \frac{N + \frac{1}{2}}{42\frac{1}{2}}.$$

The maximum error in approximating $1-8f_{10}(1-f_{10})$ is then $$\frac{1}{85}$$

or about 6.41 bits.

The maximum error in approximating $1-8f(1-f)$ by $1-8f_{10}(1-f_{10})$ is $$\frac{1}{256},$$

so the resulting accuracy is 6-bits. With Table 2 encoding only the factor $N = d_2 4^2 + d_1 4 + d_0$, the output from Table 1 is the scaled y-factor $$\frac{1}{\left(42\frac{1}{2}\right)y^2(y_i+2^{-i})^2}.$$

Overall the Table Fed PPG circuit of FIG. 8 provides an approximation to $$\frac{1}{y\hat{y}}$$

of accuracy 27 hits with total table size just 3 Kbytes. The circuit should be implementable in just 2 or 3 cycles. Note that the second table may be increased to a 10 bit index to improve the approximation of 1−8f(1−f) to about 6.2 bits with only a modest increase of about ½ Kbyte in table size. Alternatively a radix 8 version could provide over 7 bits of accuracy from the secondary table system. Thus design alternatives exist for reaching the goal of $27^+$ bits of accuracy in the approximation of $$\frac{1}{y\hat{y}}$$

with table size under 4 Kbytes and a table lookup latency of three cycles or less.

Now consider the radix 8 case with an 11 bit indexed primary table and a 12 bit indexed secondary table as illustrated in FIG. 9. The three digit number $N=d_2 8^2+d_1 8+d_0$ with $-4 \leq d_0, d_1, d_2 \leq 4$, has the integer range [−292, 292]. We thus choose a digit encoding for N in Table 2 such that $$\frac{N-\frac{1}{2}}{292\frac{1}{1}} < 1-8f_{13}(1-f_{13}) \leq \frac{N+\frac{1}{2}}{292\frac{1}{2}}.$$

The maximum error in approximating $8f_{13}(1-f_{13})$ is then $$\frac{1}{680}$$

or about 9.19 bits. The maximum error in approximating 1−8f(1−f) by $1-8f_{13}(1-f_{13})$ is $$\frac{1}{2048},$$

so the result accuracy is over 8.8 bits for the f-factor. We design the output from the primary Table 1 to include both the $1\chi$ and $3\chi$ values needed for partial product selection in a Booth radix 8 PPG. These values here are $$\frac{1}{\left(146\frac{1}{2}\right)y^2(y_i+2^{-i})^2}$$

and $$\frac{3}{\left(140\frac{1}{2}\right)y^2(y_i+2^{-i})^2}.$$

In overall performance the Table Fed PPG circuit of FIG. 9 provides an approximation to $$\frac{1}{y\hat{y}}$$

of accuracy nearly 34 bits with a total table size of some 21 Kbytes.

What is claimed is:

1. A data processing system for calculating division of a numerator by a denominator, comprising:
   a multiplier circuit;
   a multipartite division table circuit comprising two or more division table circuits operable to store two or more values that add up to a division table lookup value, the multipartite division table circuit coupled to the multiplier circuit;
   a folding inverter circuit coupled to the multiplier circuit;
   a complement inverter circuit coupled to the multiplier circuit; and
   wherein the folding inverter circuit is operable to compute a semi-complement term from the denominator, and the multiplier circuit is operable to multiply the numerator by the semi-complement term to yield a first scaled quotient.

2. The data processing system of claim 1 wherein:
   the multipartite division table circuit is operable to facilitate the selection of a value from the division tables to yield the division table lookup value, and the multiplier circuit is operable to multiply the first scaled quotient by the division table lookup value to yield a second scaled quotient.

3. The data processing system of claim 2 wherein:
   the multiplier circuit is operable to multiply the denominator by the semi-complement term to yield a scaled denominator, the multiplier circuit is operable to multiply the scaled denominator by the division table lookup value to yield a third scaling value complement, the complement inverter circuit is operable to compute the 2's complement of the third scaling value complement to yield a third scaling value, and the multiplier circuit is operable to multiply the second scaled quotient by the third scaling value to yield a third scaled quotient.

4. The data processing system of claim 3 further comprising:
   a rounding circuit coupled to the multiplier circuit wherein the rounding circuit is operable to round the third scaled quotient.

5. The data processing system of claim 1 further comprising:
   one or more register circuits, the register circuits coupled to the multiplier circuit, the multipartite division table circuit, the folding inverter circuit, and the complement inverter circuit.

6. The data processing system of claim 1 wherein the multipartite division table circuit comprises:
   a main division table circuit;
   a high order division table circuit; and
   a low order division table circuit.

7. The data processing system of claim 1 wherein the multiplier circuit comprises a pipelined multiplier circuit.

8. The data processing system of claim 1 wherein the multiplier circuit comprises a Booth recoding array multiplier.

9. A method of calculating division of a numerator by a denominator in a data processing system comprising a multiplier circuit, comprising the steps of:
- computing a semi-complement term from the denominator using a folding inverter circuit to invert selected data bits of the denominator; and
- computing a first scaled quotient by multiplying the numerator by the semi-complement term in the multiplier circuit.

10. The division method of claim 9, further comprising:
- generating a division table lookup value from the denominator in a lookup table circuit; and
- computing a second scaled quotient by multiplying the first scaled quotient by the division table lookup value in the multiplier circuit.

11. The division method of claim 9, further comprising:
- computing a scaled denominator by multiplying the denominator by the semi-complement term in the multiplier circuit;
- computing a third scaling value complement by multiplying the scaled denominator by the division table lookup value in the multiplier circuit;
- computing a third scaling value by taking the complement of the third scaling value complement using a complement circuit to invert bits of the third scaling value complement; and
- computing a third scaled quotient by multiplying the second scaled quotient by the third scaling value in the multiplier circuit.

12. The division method of claim 9 further comprising:
rounding the third scaled quotient in a rounding circuit.

* * * * *